United States Patent [19]

Torazawa et al.

[11] Patent Number: 4,993,011
[45] Date of Patent: Feb. 12, 1991

[54] OPTICAL RECORDING APPARATUS WITH SIMULTANEOUS ERASING AND RECORDING

[75] Inventors: Kenji Torazawa, Ogaki; Satoshi Sumi, Gifu; Seiji Murata, Gifu; Shigekazu Minechika, Gifu, all of Japan

[73] Assignee: Sanyo Electric Co., Ltd., Moriguchi, Japan

[21] Appl. No.: 425,503

[22] Filed: Oct. 20, 1989

Related U.S. Application Data

[63] Continuation of Ser. No. 27,382, Mar. 18, 1987, abandoned.

[30] Foreign Application Priority Data

Mar. 19, 1986 [JP] Japan .................................. 61-62450
Mar. 20, 1986 [JP] Japan .................................. 61-62526

[51] Int. Cl.$^5$ .............................................. G11B 7/00
[52] U.S. Cl. .................. 369/44.37; 369/100; 369/112; 369/13.0
[58] Field of Search ..................... 369/44–46, 369/100, 112, 13, 44.37

[56] References Cited

U.S. PATENT DOCUMENTS

| | | | |
|---|---|---|---|
| 4,283,777 | 8/1981 | Cuny et al. ......................... | 369/44 X |
| 4,298,974 | 11/1981 | Tsunoda et al. .................... | 369/44 X |
| 4,301,527 | 11/1981 | Tsunoda et al. ................... | 369/122 X |
| 4,423,495 | 12/1983 | Musha et al. ....................... | 369/43 |
| 4,502,471 | 5/1985 | Carlin ............................... | 369/122 X |
| 4,502,472 | 5/1985 | Reno .................................. | 369/122 X |
| 4,517,667 | 5/1985 | Sprague ............................ | 369/122 |
| 4,562,568 | 12/1985 | Hazel et al. ....................... | 369/112 |
| 4,571,712 | 2/1986 | Romano et al. .................... | 369/44 |
| 4,621,351 | 11/1986 | Baer et al. ......................... | 369/112 X |
| 4,630,249 | 12/1986 | Broat et al. ........................ | 369/13 |
| 4,639,907 | 1/1987 | Aoki et al. ........................ | 369/13 X |
| 4,672,594 | 6/1987 | Kato et al. ........................ | 369/13 |
| 4,686,661 | 8/1987 | Isaka ................................. | 369/13 |
| 4,729,122 | 3/1988 | Itoh .................................. | 369/44 X |
| 4,841,514 | 6/1989 | Tsuboi et al. .................... | 369/44.37 X |

FOREIGN PATENT DOCUMENTS

| | | | |
|---|---|---|---|
| 57-117106 | 1/1981 | Japan . | |
| 58-100243 | 6/1983 | Japan .................................. | 369/46 |
| 60-35303 | 2/1985 | Japan .................................. | 369/100 |
| 60-171647 | 9/1985 | Japan .................................. | 369/100 |
| 60-201547 | 10/1985 | Japan .................................. | 369/13 |
| 61-45435 | 3/1986 | Japan .................................. | 369/100 |
| 61-198453 | 9/1986 | Japan .................................. | 369/13 |
| 62-75940 | 4/1987 | Japan .................................. | 369/46 |

*Primary Examiner*—Aristotelis M. Psitos
*Attorney, Agent, or Firm*—Armstrong, Nikaido, Marmelstein, Kubovcik & Murray

[57] ABSTRACT

An erasing beam B1 and a recording beam B2 emitted from a laser diode array 20 are focused on different tracks of a optical magnetic disk D, the erasing beam B1 being focused on a track located ahead of a track on which the recording beam B2 is focused. The reflected beams of the erasing beam B1 and the recording beam B2 are separated respectively into two polarized components by means of a polarized beam splitter 17 and the polarized components are received by photo sensor means 23 and 24. Based on outputs of the photo sensor means 23 and 24, an address signal, a focus error signal and a tracking error signal are obtained. At the time of reproduction, the laser diode array 20 emits a reproducing beam so that the photo sensor means provide a reproducing signal.

5 Claims, 6 Drawing Sheets

OPTICAL RECORDING APPARATUS WITH SIMULTANEOUS ERASING AND RECORDING

This application is a continuation of application Ser. No. 027,382 filed Mar. 18, 1987, now abandoned.

BACKGROUND OF THE INVENTION

1. Field of the Invention

The present invention relates to an optical recording apparatus and particularly to an optical recording apparatus capable of writing new information while erasing already written information.

2. Description of the Prior Art

There is known an optical recording system in which a laser beam is focused on a vertical magnetic film formed on a substrate and an external magnetic field is applied to the vertical magnetic film heated by the beam to a temperature higher than the Curie point to reverse a direction of magnetization, thereby to record information. In this system, the information is reproduced in a manner in which a laser beam having lower power than that for recording is focused on the vertical magnetic film to detect rotation of a polarized face of a reflected beam of the laser beam caused by a magnetic optical effect such as a Kerr effect or a Faraday effect. Such an optical recording and reproducing system is advantageous in that information can be rewritten, compared with a system in which information is recorded by perforating a metal film. For this reason, such an optical recording and reproducing system has attracted special interest as an excellent recording and reproducing system.

FIG. 1 is a view showing an example of a conventional optical recording and reproducing apparatus using the above described optical recording and reproducing system. This example of FIG. 1 is disclosed in Japanese Patent Laying-Open No. 117106/1982. In this conventional apparatus, an information signal and an address signal are recorded on the same track of an optical magnetic disk D. The address signal has been recorded for each rotation of the disk D for example, namely, on the same line in a radial direction (for example in the form of concavities and convexities) and can not be erased by an erasing beam. This conventional apparatus is capable of recording new information by a recording beam applied to a track while it is erasing already recorded information by an erasing beam applied to a track preceding that track. More specifically, the erasing beam and the recording beam are applied to tracks adjacent to each other or tracks spaced by an amount corresponding to two tracks or more. The erasing beam detects an address to change a bias magnetic field alternately for each track. Thus, new information can be recorded by the recording beam while already recorded information is being erased by the erasing beam.

More specifically stated, a beam from a laser diode 1 for generating an erasing beam is caused to be a parallel beam through a collimating lens 2. The parallel beam passes through a beam splitter 3 and a half mirror 4 and then it passes through an objective lens 5 so that it is focused on the disk D having a surface on which a vertical magnetic film is formed). Part of a reflected beam from the disk D is reflected on the half mirror 4 and then passes through a lens 6 and a beam splitter 7 so that it is applied to a photo sensor 8 having two divided regions. The photo sensor 8 has the two regions for receiving light, which are divided with respect to a face perpendicular to the surface of the drawing, including an optical axis of a reflected beam from the disk D applied to the photo sensor 8. Since brightness patterns of light applied to the two light receiving regions are changed dependent on a positional relation between the erasing beam and track grooves when a depth of a track groove of the disk D is a value other than an integral multiple of $\frac{1}{4}$ of a wavelength of the erasing beam, the photo sensor 8 is capable of obtaining a tracking error signal by obtaining a difference of output signals of the two light receiving regions by means of a differential amplifier 9. In addition, by obtaining a sum of the output signals of the two light receiving regions by means of a summing amplifier 10, an address signal can be obtained. Based on this address signal, a current direction of a magnetic field generating coil 11 is reversed for each track so that a direction of magnetic field to be applied is reversed for each track to erase recorded information.

On the other hand, a beam from a laser diode 12 for generating a recording beam is caused to be a parallel beam through a collimating lens 13 and then it is linearly polarized through a polarizer 14 such as a Glan-Thompson prism and is reflected on the beam splitter 3 so as to be focused on a track of the disk D (a track located one track backward from that on which the erasing beam is focused) by means of the objective lens 5. The laser diode 12 for recording is driven by applying an input signal according to information to be recorded, the polarity of the input signal being inverted for each track (based on the address signal from the summing amplifier 10). As a result, the direction of magnetization of the vertical magnetic film on the disk D is reversed according to information to be recorded (the direction of magnetization being changed for each track) so that the information is recorded in the form of reversing of the direction of magnetization).

The recorded information is reproduced in the following manner. First, the laser diode 12 for recording is continuously oscillated with a small output value. A beam from the laser diode 12 is caused to be a parallel beam through the collimating lens 13. The parallel beam passes through the polarizer 14 and is focused on the disk D. A reflected beam from the disk D passes through the half mirror 4, the lens 6 and the beam splitter 7 and attains an analyser 15 such as a Glan-Thompson prism. As described above, the disk D is magnetized in a direction perpendicular to a recording face and the information is recorded according to the difference of the directions of magnetization. Consequently, the reflected beam of the linearly polarized laser beam applied to the disk D has a polarizing face rotating according to the direction of magnetization. The analyser 15 converts a difference of the rotating directions of the beam to a difference of intensity of the beam so that the beam obtained after the conversion is applied to a reproduced signal detecting photo sensor 16, where the beam is converted to an electric signal. Thus, a reproduced signal corresponding to the recorded information can be obtained from the photo sensor 16. The magnetic field generating coil 11 is not driven at the time of reproduction.

Since the laser diode 1 for erasing and the laser diode 12 for recording are provided separately in the above described conventional apparatus shown in FIG. 1, the apparatus involves disadvantages that it is complicated and has a large size and alignment of an optical system of the apparatus causes inconvenience in applying the erasing beam and the recording beam to prescribed tracks with a prescribed spacing or in bringing the beams into focused state on the disk. In addition, although the reflected beams of the erasing beam and the recording beam from the disk D attain the beam splitter 7 at the time of erasing and recording information, accuracy for applying the recording and reproducing beams on the disk with a prescribed spacing becomes less severe by adopting, in the beam splitter 7, a mirror capable of selecting wavelength. However, if the wavelengths of the two beams are close to each other, separation of the two beams by the beam splitter 7 (separation by the wavelengths of the beams) can not be effected satisfactorily. Accordingly, the reflected beam of the recording beam subjected to the modulation based on the recording information also attains the photo sensor 8 which should receive only the reflected beam of the erasing beam to detect an address signal, causing incorrect reading of the address signal.

SUMMARY OF THE INVENTION

The present invention has been accomplished in view of the above described disadvantages of the conventional apparatus and it is an object of the present invention to provide an optical recording apparatus which has a simplified optical construction and is small-sized, and is capable of correctly reading an address signal at the time of recording.

Briefly stated, in the present invention, an erasing beam and a recording beam are simultaneously emitted from a beam emitting means with an optical axis of the erasing beam and an optical axis of the recording beam being spaced from each other, and the erasing beam and the recording beam are focused on different tracks on a recording medium to perform erasing and recording of an information signal simultaneously. On the other hand, photoelectric converting means is provided at a position corresponding to a reflected beam or a transmitted beam of the erasing beam to detect an address signal.

According to another aspect of the present invention, an address signal is detected by using a control beam.

Thus, an apparatus in accordance with the present invention has a simplified optical system and has a small size since a single beam emitting means emits an erasing beam and a recording beam. In addition, since photoelectric converting means for detecting an address signal is provided at a position for receiving only an erasing beam or a control beam, cross talk between the address signal and the recorded signal never occurs and the address signal can be correctly reproduced.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
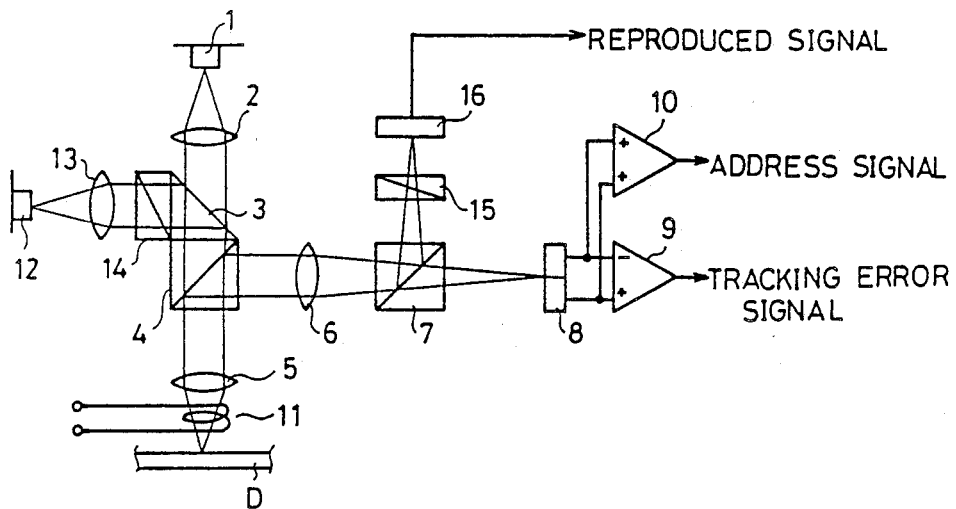
FIG. 1 shows a construction of an example of a conventional optical recording and reproducing apparatus.
Figure 2:
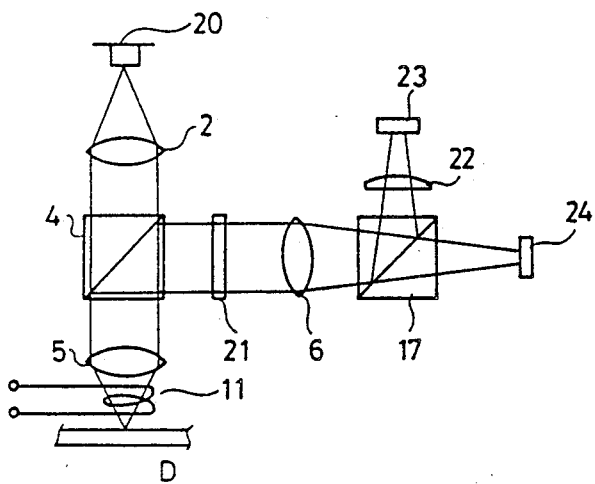
FIG. 2 shows a construction of an optical system of an optical recording and reproducing apparatus of an embodiment of the present invention.
Figure 3:
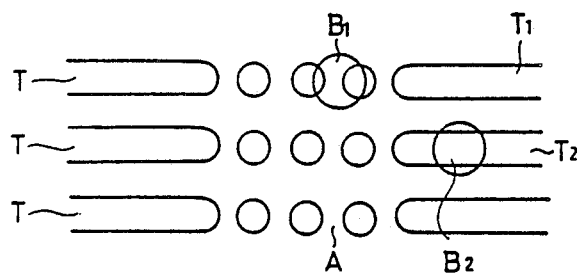
FIG. 3 is an illustration showing a relation between beams and tracks in an embodiment using two beams.
Figure 4:
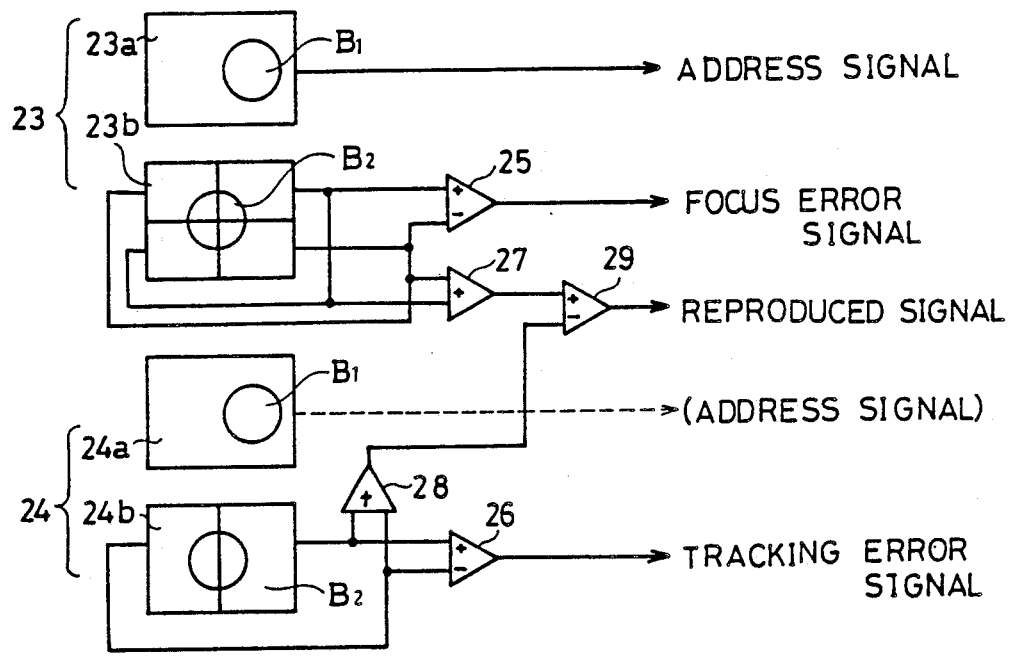
FIG. 4 shows an example of arrangement of photo sensors and signal processing circuits in an embodiment using two beams as in FIG. 3.

Referring first to FIGS. 2 to 4, a construction of an embodiment of the present invention will be described. In the construction shown in FIG. 2, portions similar to those in the conventional apparatus shown in FIG. 1 are denoted by the same reference numerals and description thereof will be omitted.

Referring to FIG. 2, a laser diode array 20 has two emitting points to emit an erasing beam B1 and a recording and reproducing beam B2. Those beams pass through a collimator lens 2 and a beam splitter 4 and then it is focused on an optical magnetic disk D through an objective lens 5. More specifically, as shown in FIG. 3, the erasing beam B1 is focused on a forward track T1 and the recording and reproducing beam B2 is focused on a subsequent track T2 adjacent to the track (or distant from the track T1 by two tracks or more). Specified portions of the respective tracks T (located for example on the same line in a radial direction) each contain an address signal A in a form non-erasable by the erasing beam B1 (for example, in the form of concavities and convexities). An information signal is recorded in an optical and magnetic manner (recorded by reversing a direction of magnetization) in the tracks T each formed as a groove for the purpose of tracking. The tracks T are formed in a spiral manner or in a coaxial manner on the disk D.

A beam reflected from the disk D passes through an objective lens 5, a beam splitter 4, a ½ wavelength plate 21 and a focusing lens 6 to attain a polarizing beam splitter 17. The beam is separated into polarized components (a P component and an S component) by the polarizing beam splitter 17. One of the polarized components passes through a cylindrical lens 22 to attain a photo sensor means 23 and the other polarized component is directly applied to a photo sensor means 24.

The arrangement of the photo sensor means 23 and 24 and signal processing circuits is as shown in FIG. 4. The photo sensor means 23 and 24 comprise two photo sensors 23a and 23b, and 24a and 24b, respectively. The photo sensors 23a and 24a are located at positions for receiving the erasing beam B1 and the photo sensors 23b and 24b are located at positions for receiving the recording and reproducing beam B2. The photo sensor 23b has four divided regions and the photo sensor 24b has two divided regions.

At the time of recording, a reflected beam of the erasing beam B1 is applied to the photo sensors 23a and 24a and an address signal may be provided from either of the photo sensors 23a and 24a. At this time, a reflected beam of the recording beam B2 is never applied to the photo sensors 23a and 24a and therefore a cross talk does not occur and a correct address signal can be obtained. A focus error signal is obtained in a manner in which output signals from the regions positioned diagonally out of the four light receiving areas of the photo sensor 23b are collected as single signals and a difference of the thus obtained two signals is detected by a differential amplifier 25. A tracking error signal is obtained in a manner in which a difference of output signals from the two light receiving regions of the photo sensor 24b is detected by a differential amplifier 26. Although those photo sensors 23b and 24b receive a reflected beam of the recording beam B2 modulated by the information signal to be recorded, no inconvenience is involved in detection of the focus error signal and the tracking error signal since there is a large difference between a frequency bandwidth of the information signal to be recorded and frequency bandwidths of the focus error signal and the tracking error signal.

In addition, although the photo sensors 23a and 24a can be formed as a sensor having two divided regions and a photo sensor having four divided regions, respectively, to obtain a tracking error signal and a focus error signal together with an address signal (namely, to obtain a tracking error signal and a focus error signal based on the reflected beam of the erasing beam), the focus error signal and the tracking error signal can be obtained with more accuracy in the embodiment shown in FIG. 4 in which the focus error signal and the tracking error signal is formed based on the reflected beam of the recording beam applied to a track to be actually recorded.

On the other hand, at the time of reproduction, an oscillation output of the laser diode array 20 is decreased and the output is continuously oscillated so that the reproducing beam can be obtained, instead of the recording beam, from the laser diode array 20. Although a reproduced signal can be obtained from either the photo sensor 23b or the photo sensor 24b in this case, a reproduced signal having a better S/N ratio can be obtained in a construction in which a differential amplifier 29 detects a difference of two sum signals, namely, a sum signal of the outputs of the four light receiving regions of the photo sensor 23b, which is formed by a summing amplifier 27, and a sum signal of the outputs of the two light receiving regions of the photo sensor 24b, which is formed by a summing amplifier 28. In addition, the focus error signal and the tracking error signal can be obtained from the photo sensors 23b and 24b in the same manner as in recording. Further, an address signal can be obtained by the photo sensor 23a or 24a in a manner in which a reproducing beam is obtained instead of the erasing beam by decreasing an oscillation output of the laser diode array 20 to detect a reflected beam of the reproducing beam. The address signal may be obtained from the output signal of the summing amplifier 28.

Figure 5:
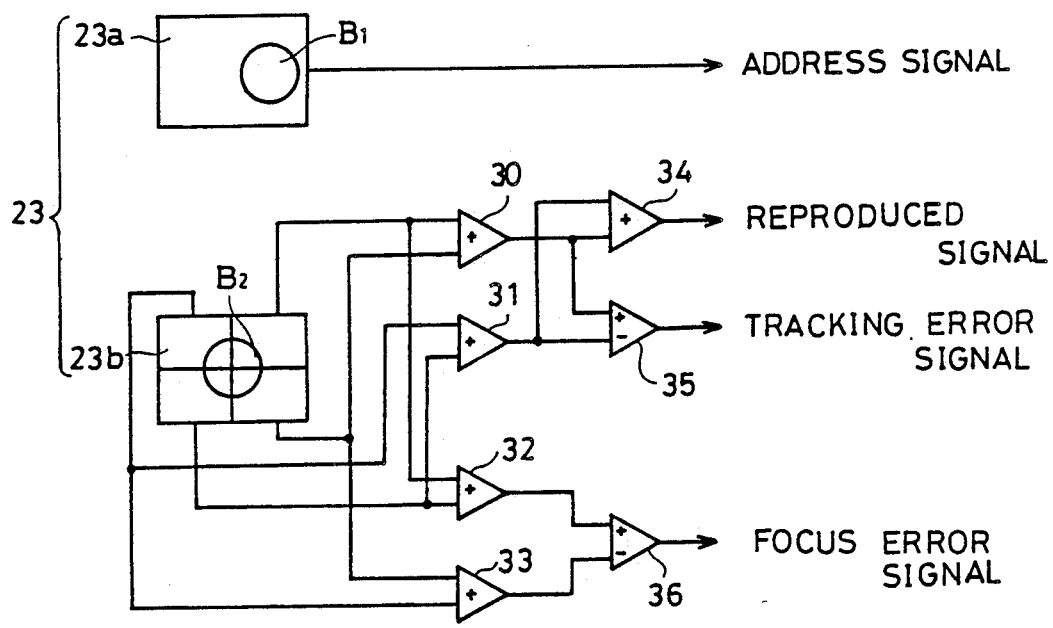
FIG. 5 shows another example of arrangement of photo sensors and signal processing circuits in an embodiment using two beams as in FIG. 3.

FIG. 5 shows another embodiment in which only a single sensor means 23 is provided as the sensor means in the system using two beams B1 and B2 as in the case of FIG. 3. In this case of FIG. 5, the address signal is obtained from the photo sensor 23a in the same manner as in the embodiment shown in FIG. 4. The reproduced signal is obtained by using the summing amplifiers 30, 31 and 34 for obtaining a sum of the output signals of the four light receiving regions of the photo sensor 23b. The tracking error signal is obtained in a manner in which a sum signal of the regions on the right side out of the four light receiving regions of the photo sensor 23b and a sum signal of the regions on the left side thereof are formed by the summing amplifiers 30 and 31 to detect a difference of those two sum signals by a differential amplifier 35. The focus error signal is obtained in a manner in which sum signals of the respective two regions positioned diagonally out of the four light receiving regions of the photo sensor 23b are formed by summing amplifiers 32 and 33, respectively, to detect a difference of those two sum signals by a differential amplifier 36. However, the embodiment shown in FIG. 5 does not utilize a differential output of the two photo sensors 23b and 24b having a push-pull relation as in the embodiment shown in FIG. 4 and consequently an S/N ratio of a reproduced signal obtained is lowered. More specifically, the reproducing beam received by the polarizing beam splitter 17 is polarized in a direction P of polarization or a direction S of polarization according to a recorded signal and the polarized beam is separated by the polarizing beam splitter 17. Therefore, an in-phase noise component is reduced and an S/N ratio is improved if a differential output of the photo sensors 23b and 24b is used as a reproduced signal.

Fundamental principles of erasing, recording and reproduction of the optical magnetic disk D in the above described embodiment are the same as in the conventional apparatus shown in FIG. 1. The direction of magnetization of the magnetic field generating coil 11 is also reversed in the same manner for each track based on the address signal at the time of erasing the recording. It is the same with other embodiments to be described below.

Figure 6:
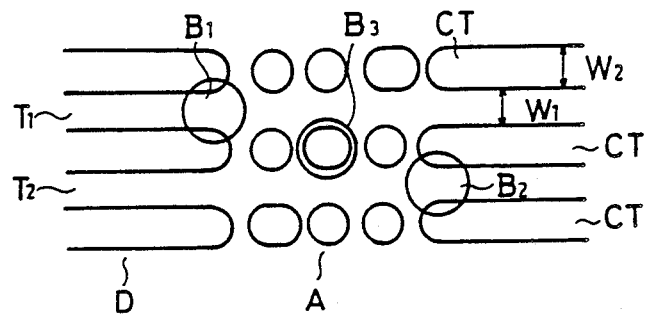
FIG. 6 is an illustration showing a relation between beams and tracks in another embodiment using three beams.
Figure 8:
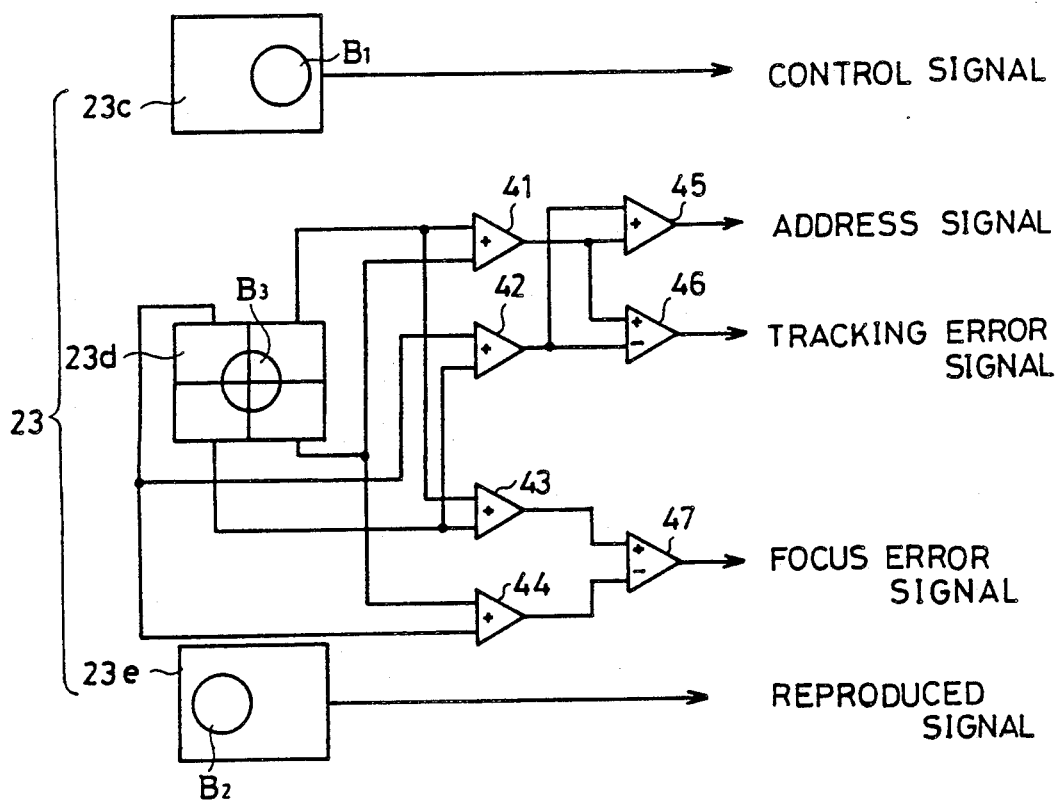
FIG. 8 shows another example of arrangement of photo sensors and signal processing circuits in an embodiment using three beams as in FIG. 6.

FIGS. 6 and 8 shown another embodiment using a laser diode array having three emitting points as the laser diode array 20 shown in FIG. 2. More specifically, the laser diode array 20 in this embodiment of FIGS. 6 and 8 emits an erasing beam B1, a recording and reproducing beam B2 and a control beam B3 as shown in FIG. 6. Record tracks and control tracks are formed alternately as shown in FIG. 6 on the optical magnetic disk D used in this embodiment. An information signal is recorded in an optical and magnetic manner (recorded by reversing the direction of magnetization) on each of the record tracks T1, T2 etc. An address signal A is mechanically recorded (for example, in a form of concavities and convexities) on each control track CT at a position on the same line in a radial direction. The other portion of each control track CT serves as a groove for tracking. Those record tracks and control tracks are formed in a spiral manner or in a coaxial manner on the optical magnetic disk D.

On the optical magnetic disk D, the erasing beam B1 is focused on a record track (a record track T1 in FIG. 6) located at a position preceding the position of the recording and reproducing beam B2. The recording and reproducing beam B2 is focused on a record track T2 adjacent to the record track T1 on which the erasing beam B1 is focused (the recording and reproducing beam B2 may be focused on a track spaced from the track T1 by a distance corresponding to two track or more). The control beam B3 is focused on a control track CT located between the record track on which the erasing beam B1 is focused and the record track on which the recording and reproducing beam B2 is focused.

The arrangement of the photo sensor means 23 and 24 and signal processing circuits in the embodiment using three beams B1 to B3 as described above is as shown in FIG. 7 for example. More specifically, the photo sensor means 23 and 24 comprise respectively three photo sensors 23c to 23e and 24c to 24e. The photo sensors 23c and 24c are disposed at positions for receiving the erasing beams B1; the photo sensors 23e and 24e are disposed at positions for receiving the recording and reproducing beam B2; and the photo sensors 23d and 24d are disposed at positions for receiving the control beam B3. The photo sensor 23d has four divided regions and the photo sensor 24d has two divided regions. In addition, differential amplifiers 37 to 39 and a summing amplifier 40 are provided as signal processing circuits for the photo sensors 23c to 23e and 24c to 24e. Other portions of the optical system are the same as shown in FIG. 2.

Figure 7:
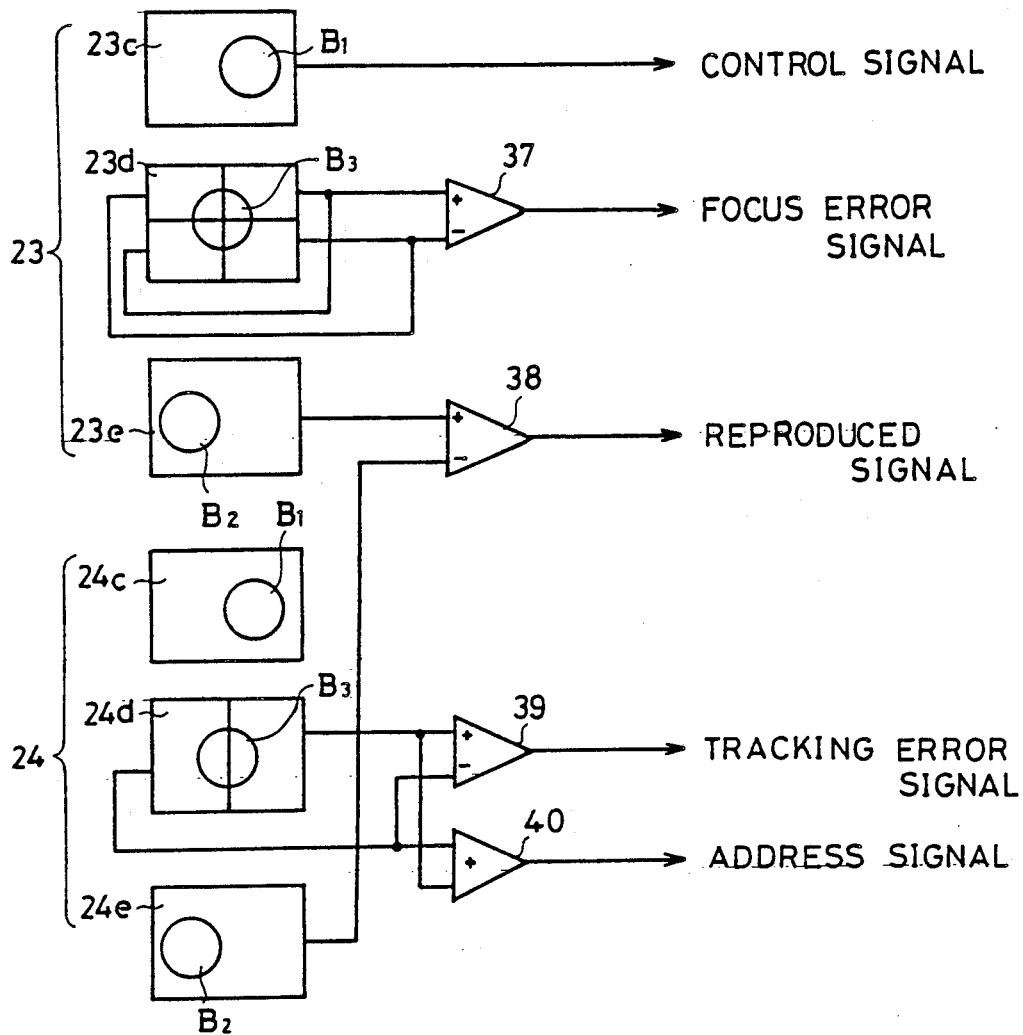
FIG. 7 shows an example of arrangement of photo sensors and signal processing circuits in an embodiment using three beams as in FIG. 6.

Now, operation of the embodiment shown in FIGS. 6 and 7 will be described. At the time of recording, the control beam B3 is applied to the photo sensors 23d and 24d. Out of the four light receiving regions of the photo sensor 23d, the outputs of the respective two regions located diagonally are collected as single outputs. The differential amplifier 37 detects a difference between the thus collected outputs to provide a focus error signal. A difference of the outputs from the two light receiving regions of the photo sensor 24d is detected by the differential amplifier 39 so that a tracking error signal is provided. The summing amplifier 40 detects a sum of the outputs of the two light receiving regions of the photo sensor 24d (or a sum of the outputs of the four light receiving regions of the photo sensor 23d) to provide an address signal. The address signal thus obtained has an accuracy since the photo sensors 23d and 24d never receive any reflected beam of the recording beam B2. Based on this address signal, the polarity of a bias field caused by the magnetic field generating coil 11 is changed for each record track, whereby new information is enabled to be recorded by the recording beam B2 while already recorded information is being erased by the erasing beam B1.

A control signal for detecting scratches or the like on the optical magnetic disk D may be obtained from the photo sensor 23c (or the photo sensor 24c) receiving the erasing beam B1 focused at a position preceding that of the recording beam B2, and using this control signal, loop gains, frequency characteristics and the like of a tracking servo circuit, a focus servo circuit etc. (not shown) may be controlled.

At the time of reproduction, an oscillation output of the laser diode array 20 is decreased so that the reproducing beam, instead of the recording beam, can be obtained from the laser diode array 20. In this case, although a reproduced signal may be obtained from either the photo sensor 23e or the photo sensor 24e, a reproduced signal having a better S/N ratio can be obtained in the construction in which the differential amplifier 38 detects a difference between the outputs of those photo sensors 23e and 24e. A focus error signal, a tracking error signal, an address signal and a control signal are obtained in the same manner as at the time of recording.

FIG. 8 shows another embodiment in which only a single photo sensor means 23 is provided as the photo sensor means in the system using three beams B1 to B3 as in the case of FIG. 6. In FIG. 8, a control signal is obtained from the photo sensor 23c and a reproduced signal is obtained from the photo sensor 23e. The signals from the four light receiving regions of the photo sensor 23d are summed by using the summing amplifiers 41, 42 and 45 to provide an address signal. A difference between a sum signal of the right half of the four light receiving regions and a sum signal of the left half thereof is detected by using the summing amplifiers 41 and 42 and the differential amplifier 46 so that a tracking error signal can be obtained. Sum signals of the diagonally positioned regions out of the four light receiving regions are obtained by the summing amplifiers 43 and 44 respectively and a difference between those sum signals is detected by the differential amplifier 47 so that a focus error signal can be obtained. In this case, a difference output between the two photo sensors 23e and 24e in a push-pull relation is not utilized as shown in FIG. 7 and according an S/N ratio of the reproduced signal obtained is lowered as in the case of FIG. 5.

Figure 9:
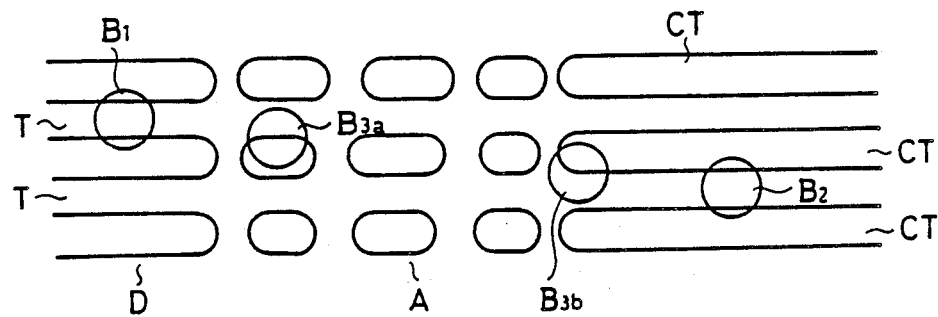
FIG. 9 is an illustration showing a relation between beams and tracks in a further embodiment using four beams.
Figure 10:
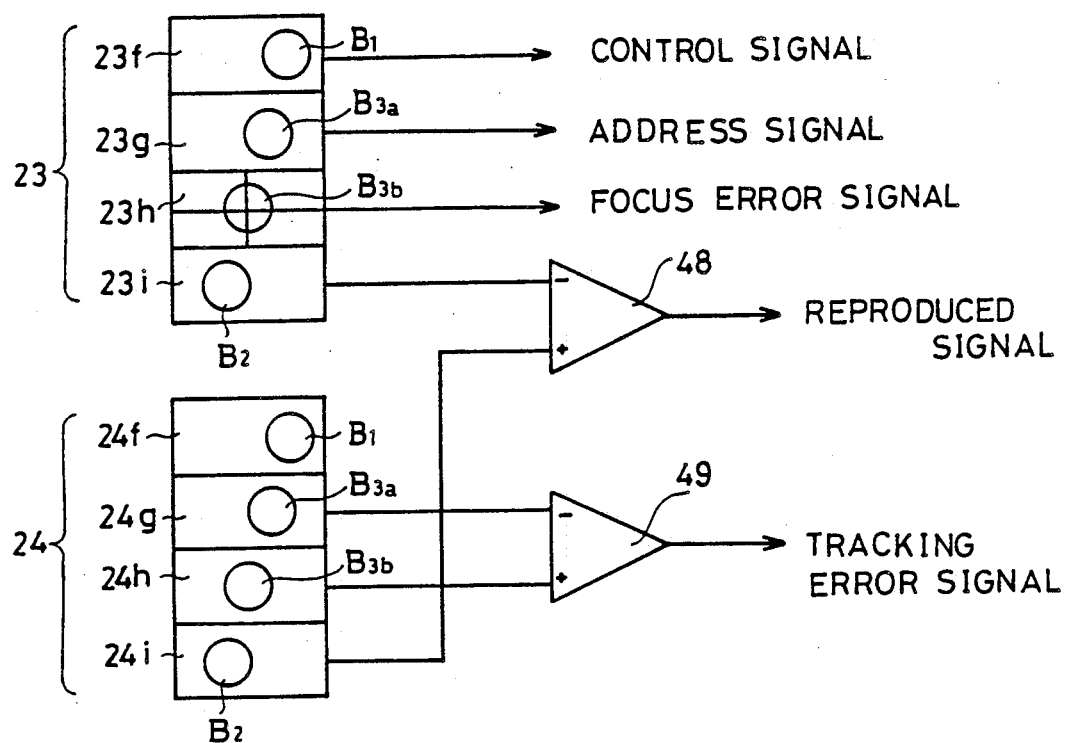
FIG. 10 shows an arrangement of photo sensors and signal processing circuits in an embodiment using four beams as in FIG. 9.

FIGS. 9 and 10 shown a further embodiment using, as the laser diode array 20 shown in FIG. 2, a laser diode array having four emitting points for outputting the erasing beam B1, the recording and reproducing beams B2 and two control beams B3a and B3b. As shown in FIG. 9, a structure of an optical magnetic disk D is the same as in FIG. 6. Focusing points of the control beams B3a and B3b are determined so that nearly half amounts of those beams are applied to an identical control track CT1. In this embodiment, the photo sensor means 23 and 24 and the signal processing circuit thereof are arranged as shown in FIG. 10. More specifically, the photo sensor means 23 and 24 have respectively four photo sensors 23f to 23i and 24f to 24i. The photo sensor 23h out of those photo sensors is formed as a photo sensor having four divided regions. The photo sensors 23f and 24f are located at positions for receiving the erasing beam B1; the photo sensors 23i and 24i are located at positions for receiving the recording and reproducing beam B2; the photo sensors 23g and 24g are located at positions for receiving the control beam B3a; and the photo sensors 23h and 24h are located at positions for receiving the control beam B3b.

In the above described arrangement, a control signal is obtained from the photo sensor 23f and an address signal is obtained from the photo sensor 23g. A focus error signal is obtained from the photo sensor 23h by using a signal processing circuit (not shown in FIG. 10) which is the same as the differential amplifier 37 shown in FIG. 7. A difference of the outputs of the photo sensors 23i and 24i is detected by the differential amplifier 48 so that a reproduced signal is obtained. In addition, a difference of the outputs of the photo sensors 24g and 24h is detected by the differential amplifier 49 so that a tracking error signal is obtained. This tracking error signal is a tracking error signal for a three-beam system in a so-called compact disk player. Although nearly half amounts of the control beams B3a and B3b are applied to the control tracks CT, no inconvenience is caused in detection of those signals.

Figure 11:
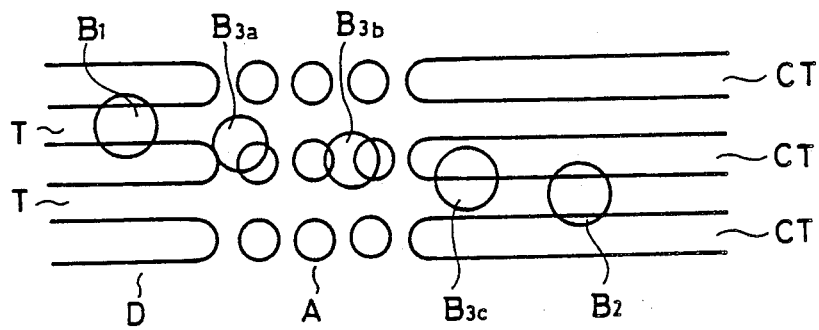
FIG. 11 is an illustration showing a relation between beams and tracks in a further embodiment using five beams.
Figure 12:
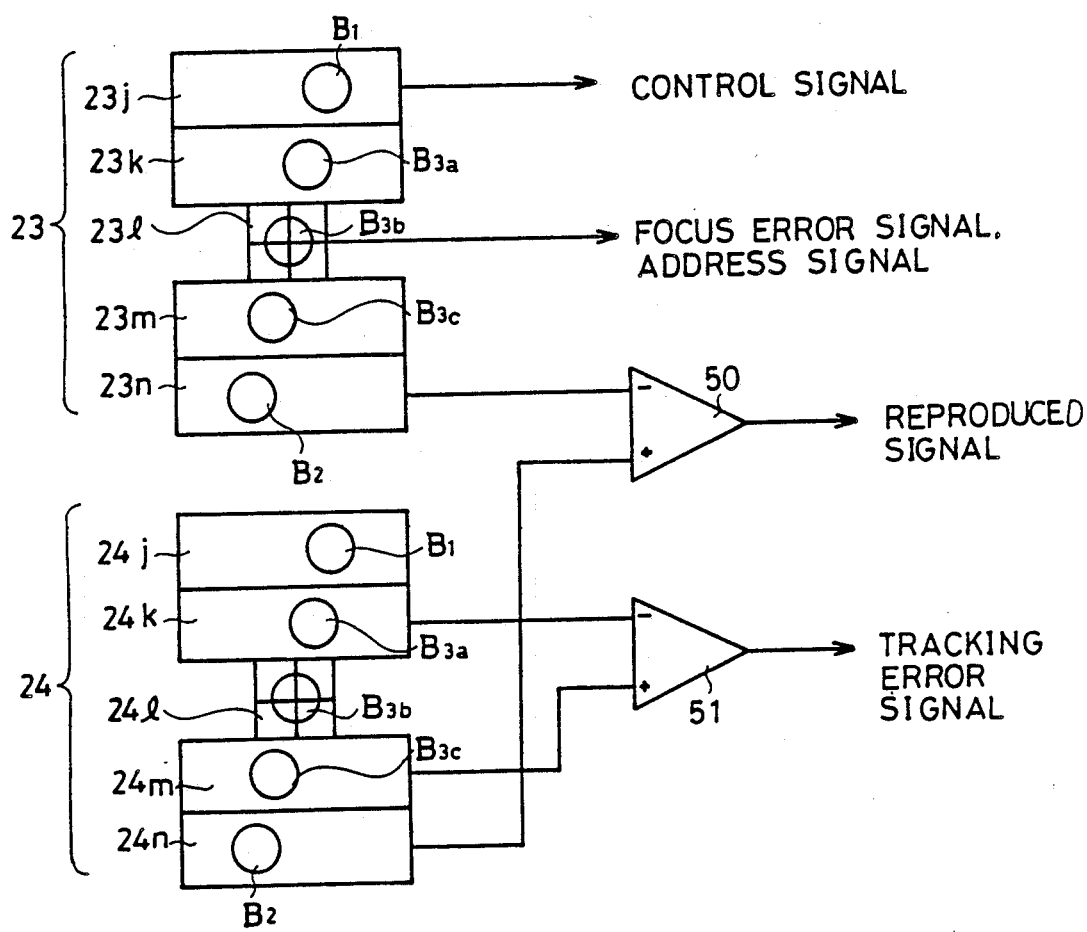
FIG. 12 shows an arrangement of photo sensors and signal processing circuits in an embodiment using five beams as in FIG. 11.

FIGS. 11 and 12 show a further embodiment using three control beams B3a to B3c as the control beams. As shown in FIG. 11, focusing positions of the control beams B3a to B3c are determined so that nearly half amounts of the control beams B3a and B3c are applied to a control track CT and that the control beam B3b is positioned just on the control track CT. The erasing beam B1 and the recording and reproducing beam B2 are focused on record tracks T adjacent respectively to the control track CT. On the other hand, the photo sensor means 23 and 24 and the signal processing circuits thereof are arranged as shown in FIG. 12 for example. More specifically, the photo sensor means 23 and 24 have respectively five photo sensors 23j to 23n and 24j to 24n. The photo sensors 231 and 241 are formed as photo sensors each having four divided regions. The photo sensors 23j and 24j are disposed at positions for receiving the erasing beam B1; the photo sensors 23k and 24k are disposed at positions for receiving the control beam B3a; the photo sensors 23l and 24l are disposed at positions for receiving the control beam B3b; the photo sensors 23m and 24m are disposed at positions for receiving the control beam B3c; and the photo sensors 23n and 24n are disposed at positions for receiving the recording and reproducing beam B2.

In the above described arrangement, a control signal is obtained from the photo sensor 23j. A focus error signal and an address signal are obtained from the photo sensor 231 by using the signal processing circuits 41 to 45 and 47 shown in FIG. 8 (though not shown in FIG. 12). The differential amplifier 50 detects a difference of the outputs of the photo sensors 23n and 24n so that a reproduced signal is obtained. A differential amplifier 51 detects a difference of the outputs of the photo sensors 24k and 24m so that a tracking error signal is obtained.

In the embodiments shown in FIG. 5 to 11, information can be continuously recorded without interruption because a record track on which information is recorded and a control track on which an address signal is recorded are different tracks. In the system as shown in FIG. 3 in which an address is formed on a portion of a record track, information can not be recorded in the address portion, while the embodiments shown in FIGS. 5 to 11 do not involve such inconvenience. In addition, a width W1 of a record track T and a width W2 of a control track CT are preferably in a relation of W1>W2 (as shown in FIG. 6). This is because information is reproduced by detecting rotation of a polarized face dependent of a direction of magnetization in the case of optical magnetic recording and reproduction, and therefore the width of the record track T has preferably a relatively large width.

Although the above described embodiments are of an optical magnetic recording type, the present invention is also applicable to an apparatus of a type for recording information by changing a reflectance or a transmittance of a disk.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording and reproducing apparatus erasing an already recorded information signal and recording a new information signal simultaneously on a record medium including, tracks on which a non-erasable address signal and an erasable information signal are recorded in an optically readable manner, said tracks being in a spiral form or a coaxial form, said optical recording apparatus comprising:
   beam emitting means, having at least two beam emitting points, for emitting simultaneously an erasing beam and one of a recording beam and a reproducing beam, an optical axis of said erasing beam and an optical axis of one of said recording beam and said reproducing beam being spaced from each other;
   optical means for focusing said erasing beam on one of said tracks and for focusing one of said recording beam and said reproducing beam on a different track located a distance from said one of said tracks;
   a first photoelectric converting means, disposed at a position for receiving a reflected beam or a transmitted beam of only said erasing beam applied to said one of said tracks, for converting said reflected beam or said transmitted beam into said address signal; and
   a second photoelectric converting means, disposed at a position for receiving a reflected beam or a transmitted beam of only said recording beam applied to said different track, for converting said reflected beam or said transmitted beam into a focus error signal and a tracking error signal.

2. An optical recording and reproducing apparatus in accordance with claim 1, further comprising:
   splitting means for splitting the respective reflected beams or transmitted beams of said erasing beam and one of said recording beam and said reproducing beam to two directions,
   said first photoelectric converting means comprising two photoelectric converting means for separately receiving two erasing beams branched by said splitting means, and
   said second photoelectric converting means comprising focus error signal detection photoelectric converting means and tracking error signal detection photoelectric converting means for separately receiving two recording beams or reproducing beams split by said splitting means.

3. An optical recording and reproducing apparatus in accordance with claim 2, wherein
   when said beam emitting means emits said reproducing beam, instead of said recording beam, from the emitting point, said second photoelectric converting means for outputting a difference signal relating to a difference between an output of said focus error signal detection photoelectric converting means and an output of said tracking error signal detection photoelectric converting means, said difference signal output as a reproduced signal of the information signal recorded on said tracks.

4. An optical recording and reproducing apparatus erasing an already recorded information signal and recording a new information signal simultaneously on a record medium including control tracks and record tracks are formed alternately in a spiral form or a coaxial form, said control tracks having an address signal recorded in an optically readable manner, and said tracks having an information signal recorded in an optically readable manner, said optical recording apparatus comprising:

beam emitting means, having at least three emitting points, for simultaneously emitting (a) an erasing beam, (b) one of a recording beam and a reproducing beam and (c) a control beam, an optical axes of said beams being spaced from one another;

optical means for focusing said erasing beam on one of said record tracks, for focusing one of said recording beam and said reproducing beam on another record track located at a distance from said one of said record tracks and for focusing said control beam on one of said control tracks, which is positioned between the record track on which the erasing beam is emitted and the record track on which one of the recording beam and reproducing beam is emitted;

splitting means for splitting, into two beams in two directions, a reflected beam or a transmitted beam of each of (a) said erasing beam, (b) one of said recording beam and said reproducing beam, and (c) said control beam;

first reproduced signal detection photoelectric converting means for receiving one of the two beams of the reproducing beam obtained in said splitting means by splitting the reflected beam or the transmitted beam of said reproducing beam applied to said record track;

second reproduced signal detection photoelectric converting means for receiving the other of the two beams of the reproducing beam split by the splitting means;

photoelectric converting means, disposed at a position for receiving a reflected beam or a transmitted beam of only said control beam applied to said control track, for converting said reflected or transmitted beam into said address signals, said photoelectric converting means comprising two photoelectric converting means for separately receiving the two beams of the control beam split by said splitting means, one of said two photoelectric converting means used as the photoelectric converting means for converting the split reflected or transmitted beams into a focus error signal, and the other photoelectric converting means used as the photoelectric converting means for converting the split reflected or transmitted beams into a tracking error signal, said address signal converted by either of the two photoelectric converting means;

wherein said photoelectric converting means for outputting a difference signal, related to a difference between an output of said first reproduced signal detection photoelectric converting means and an output of said second reproduced signal detection photoelectric converting means, said difference signal output as a reproduced signal of the information signal recorded on said record track.

5. An optical recording and reproducing apparatus in accordance with claim 4, wherein said beam emitting means has a plurality of control beam emitting points for emitting a plurality of control beams, and said photoelectric converting means comprises two pairs of photoelectric means for separately receiving reflected beams or transmitted beams of said plurality of control beams.

* * * * *